US012056247B2

(12) United States Patent
Youssefi et al.

(10) Patent No.: US 12,056,247 B2
(45) Date of Patent: Aug. 6, 2024

(54) SYSTEM AND METHOD FOR GENERATING PRIVACY DATA CONTAINMENT AND REPORTING

(71) Applicant: PayPal, Inc., San Jose, CA (US)

(72) Inventors: Amir Hossein Youssefi, Fremont, CA (US); Ravi Retineni, Fremont, CA (US); Alejandro Picos, New York, NY (US); Gaoyuan Wang, San Jose, CA (US); Li Cao, San Jose, CA (US); Deepa Madhavan, Chennai (IN); Srinivasabharathi Selvaraj, Chennai (IN)

(73) Assignee: PAYPAL, INC., San Jose, CA (US)

( * ) Notice: Subject to any disclaimer, the term of this patent is extended or adjusted under 35 U.S.C. 154(b) by 416 days.

(21) Appl. No.: 17/364,880

(22) Filed: Jul. 1, 2021

(65) Prior Publication Data

US 2021/0326457 A1 Oct. 21, 2021

Related U.S. Application Data

(63) Continuation of application No. 16/023,819, filed on Jun. 29, 2018, now Pat. No. 11,062,036.

(30) Foreign Application Priority Data

May 11, 2018 (IN) ............................ 201841017790

(51) Int. Cl.
*G06F 21/60* (2013.01)
*G06F 16/90* (2019.01)
*G06N 20/00* (2019.01)

(52) U.S. Cl.
CPC ............ *G06F 21/602* (2013.01); *G06F 16/90* (2019.01); *G06N 20/00* (2019.01); *G06F 2221/2149* (2013.01)

(58) Field of Classification Search
CPC ............... G06F 21/602; G06F 21/6245; G06F 2221/2149; G06N 21/602
See application file for complete search history.

(56) References Cited

U.S. PATENT DOCUMENTS 11,062,036 B2 7/2021 Youssefi et al.
2014/0081894 A1 3/2014 Heidasch
(Continued)

FOREIGN PATENT DOCUMENTS

CN 102750465 A 10/2012
CN 102750645 10/2012
WO WO 2017/187207 11/2017

OTHER PUBLICATIONS

International Appl. No. PCT/US2019/031611, International Preliminary Report on Patentability mailed on Nov. 26, 2020, 8 pages.
(Continued)

*Primary Examiner* — Ellen Tran
(74) *Attorney, Agent, or Firm* — Haynes and Boone, LLP

(57) ABSTRACT

Aspects of the present disclosure involve, a customizable system and infrastructure which can receive privacy data from varying data sources for privacy scanning, containment, and reporting. In one embodiment, data received is scanned for privacy data extraction using various data connectors and decryption techniques. In another embodiment, the data extracted is transferred to a privacy scanning container where the data is analyzed by various deep learning models for the correct classification of the data. In some instances, the data extracted may be unstructured data deriving form emails, case memos, surveys, social media posts, and the like. Once the data is classified, the data may be stored or contained according to the classification of the data. Still in another embodiment, the classified data may be retrieved by an analytics container for use in reporting.

20 Claims, 10 Drawing Sheets

(56) References Cited

U.S. PATENT DOCUMENTS

| | | | |
|---|---|---|---|
| 2014/0181888 | A1 | 6/2014 | Li et al. |
| 2016/0132696 | A1 | 5/2016 | Mdhani et al. |
| 2016/0148113 | A1 | 5/2016 | Kolter et al. |
| 2016/0283735 | A1 | 9/2016 | Wang et al. |
| 2016/0359895 | A1 | 12/2016 | Chiu et al. |
| 2016/0359921 | A1 | 12/2016 | Li et al. |
| 2017/0006135 | A1 | 1/2017 | Siebel et al. |
| 2017/0230387 | A1 | 8/2017 | Srinivasan et al. |
| 2018/0107941 | A1 | 4/2018 | Siebel et al. |
| 2018/0113996 | A1 | 4/2018 | Cai et al. |
| 2019/0190921 | A1 | 6/2019 | Rieser et al. |
| 2019/0347428 | A1 | 11/2019 | Youssefi et al. |

OTHER PUBLICATIONS

International Appl. No. PCT/US2019/031611, International Search Report and Written Opinion mailed on Jul. 29, 2019, 8 Pages.

Extended European Search Report for Application No. 19799722.4 mailed on Dec. 16, 2021, 8 pages.

500

| ID | Source Type | System Name | Language | |
|---|---|---|---|---|
| 284513776 | Email | Email System | English | {"SOURCE_LOGIAL_INSTANCE_Email_DB":"Email_System", "SOURCE_ROW_ID": "100012600", "DATA_Type": "suject:Thank you for your email. Re: Notification of Donation Received\nvalue:<divdir = \"ltr\"><div><div><div>Atlantic Hindu Temple and Community Center Committee thanks you for your email<br><\div>>a Non-Profit 501C3 Organization, Tax-Id XXX-XXX<br>" |

FIG. 5A

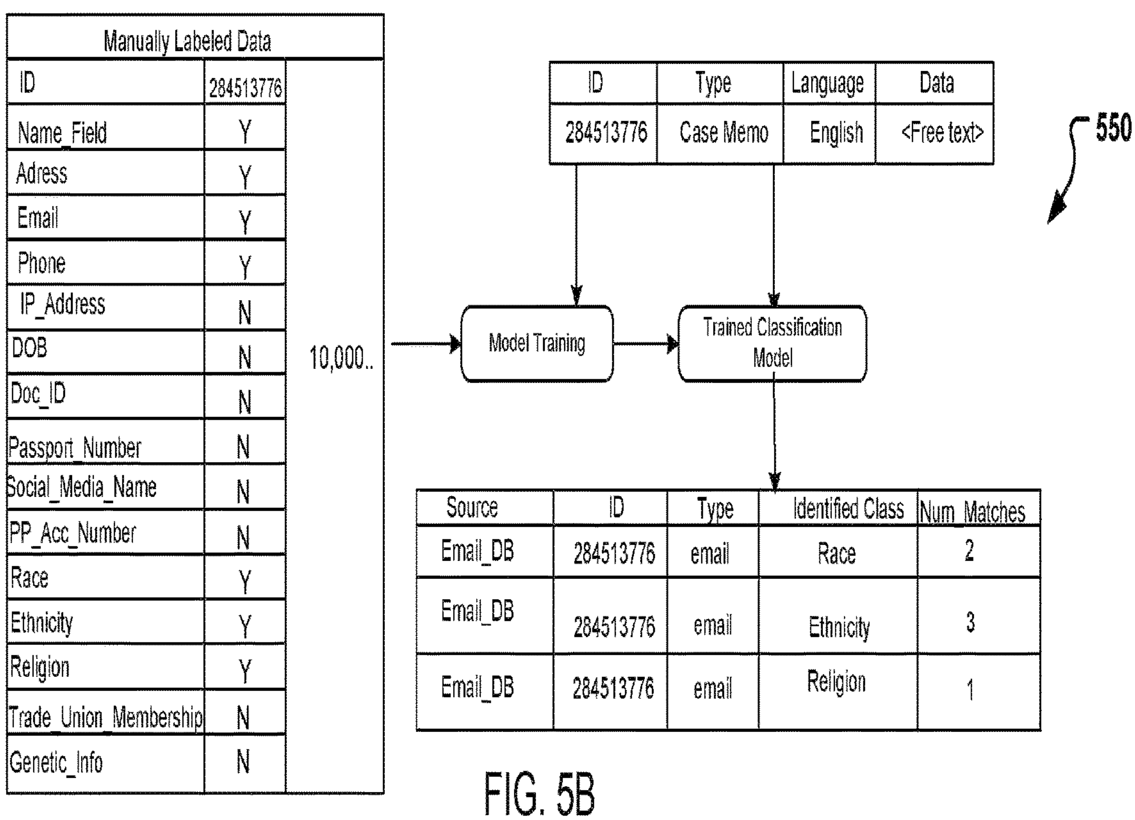

SYSTEM AND METHOD FOR GENERATING PRIVACY DATA CONTAINMENT AND REPORTING

RELATED APPLICATIONS

This application is a continuation of U.S. application Ser. No. 16/023,819, filed Jun. 29, 2018, which is hereby incorporated by reference in its entirety.

TECHNICAL FIELD

The present disclosure generally relates to privacy data systems, and more specifically, to privacy data systems used for data containment and reporting.

BACKGROUND

Nowadays millions and millions of electronic transactions occur on a daily basis. As such, a large amount of data is transmitted between devices and systems. In some instances, private user data is included in the data transmitted. As such, it is important to ensure that the private user data is correctly handled and manipulated. Further, regulations and user consents must be followed. However, in some occasions, private user data may be advertently or even inadvertently shared with a third party. This however, is not acceptable and can lead to loss of funds, credit, goodwill, and frustration by a user. Therefore, it would be beneficial to create a system or method that can is capable of handling privacy data with adequate rules, storage, and reporting in place for the protection of a user.

BRIEF DESCRIPTION OF THE FIGURES

FIG. 5A illustrates a chart illustrating a sample source data.

FIG. 5B illustrates a chart illustrating a sample unstructured data extraction and categorization.

Figure 1:
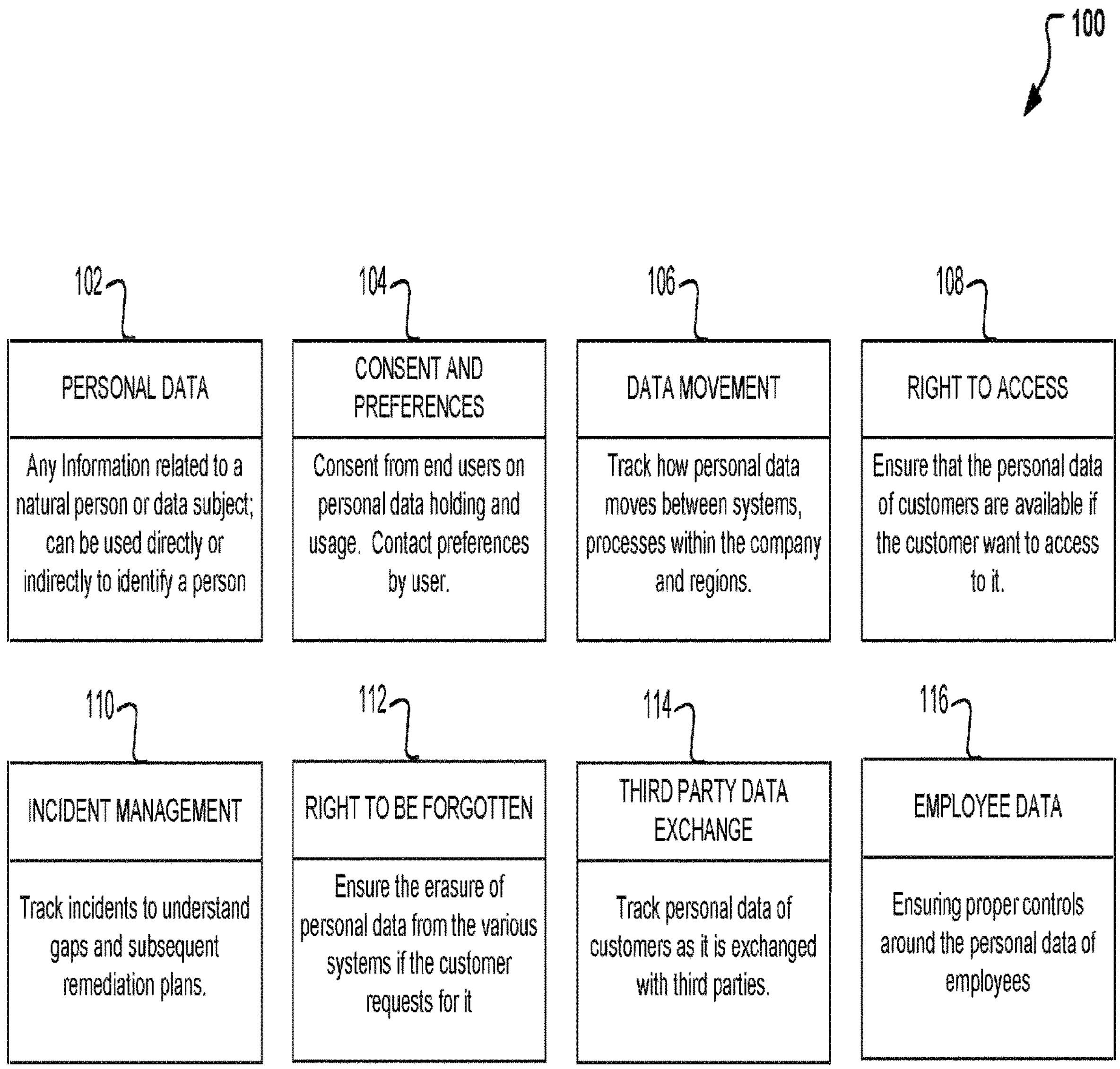
FIG. 1 illustrates exemplary data categories applicable to general data protection regulations.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve, a customizable system and infrastructure which can receive privacy data from varying data sources for privacy scanning, containment, and reporting. In particular, a system is introduced which can protect a user's privacy data by putting in place a container system designed to safeguard the information using deep learning models which follow general data protection regulations for the secure movement of the private data. The information received is transferred between a series of containers designed for portability and deployment. In one embodiment, data received is scanned for privacy data extraction using various data connectors and decryption techniques. In another embodiment, the data extracted is transferred to a privacy scanning container where the data is analyzed by various deep learning models for the correct classification of the data. In some instances, the data extracted may be unstructured data deriving form emails, case memos, surveys, social media posts, and the like. Once the data is classified, the data may be stored or contained according to the classification of the data. Still in another embodiment, the classified data may be retrieved by an analytics container for use in reporting. Data reporting can include the use of a data privacy cockpit design to provide a user interface for view and access of personal data across various systems using numerous metrics, heatmaps, and lineage charts. A dashboard and reporting system may further be used to illustrate user consent reporting across various platforms.

Financial institutions are constantly involved in ensuring client accounts are safe and risk is minimized. To protect client accounts and user privacy information, institutions may rely on the use of systems which have safeguards in place to protect user information. Conventional systems, however are generally not equipped to store, safeguard, and report out user privacy information. As such, a user's information may be compromised, released without consent, or sold without adequate measures in place. Therefore it would be beneficial to introduce a system and method that can be used for privacy data containment and reporting with comprehensive rules in place such that sensitive information is secured.

Sensitive information can include various types of information in relation to a user, preferences, and regulations. For example, privacy data can include information under the general data protection regulation (GDPR) and the legal ways in which to process personal data. FIG. 1 is introduced which exemplary data categories 100 and ways to process the personal data applicable to general data protection regulations. In one embodiment, the general data protection regulation may include persona data 102. Personal data can include any information related to a natural person or data subject. In addition personal data can include data that may be used directly or indirectly to identify a person. For example, personal data can include, a person's name, an identification number, online identifier (e.g., internet protocol (IP) address), a location number, and/or other descriptive factors including but not limited to a person's physical, physiological, genetic, mental, economic, cultural, and social identity.

In another embodiment, a privacy data category 100 can include user consent and preferences 104. Consent and preferences data 104 can include consent from end users on personal data holding and users. In addition, consent and preferences data 104 can include contact preferences by user. For example, consent and preferences can include consent to use a user's personal data from web forms, mobile applications, email, phone calls, paper forms, in person, on video, etc.

Data movement 106 is still another privacy data category 100 and form of processing data which can include tracking how personal data moves between systems and is processed within a company and/or across regions. For example, this can include the transfer of data between groups as an account is first created and a transaction is then processed.

Another privacy data category can also include a right to access 108 process which ensures that the personal data of the customers or users is available for view and use if the customer/user wants to access it. Incident management 110 is yet another category where incidents are tracked and used to understand gaps in a system. Incident management 110 is also useful in preparing subsequent remediation plans available in response to an incident.

Another category often recognized particularly in countries includes the right to be forgotten 112. This category includes data and rules in place to ensure the erasure of personal data occurs on the various systems as necessary and requested by the customer. Data can also move between third parties and as such a third party data exchange 114 category is followed as indicated by the general data protection regulation.

Still another category can include employee data 116, where proper controls and processed are put in place to ensure the personal data of an employee is secure.

Note that further to the regulations indicated by the GDPR, other regulations, rules, and procedures may be put in place for the protection, processing, and containment of user privacy data. For example, the consumer financial protection bureau (CFPB) may include some guidance and compliance regulations that may be implemented in the current system in order to safeguard a consumer's privacy data.

Figure 2:
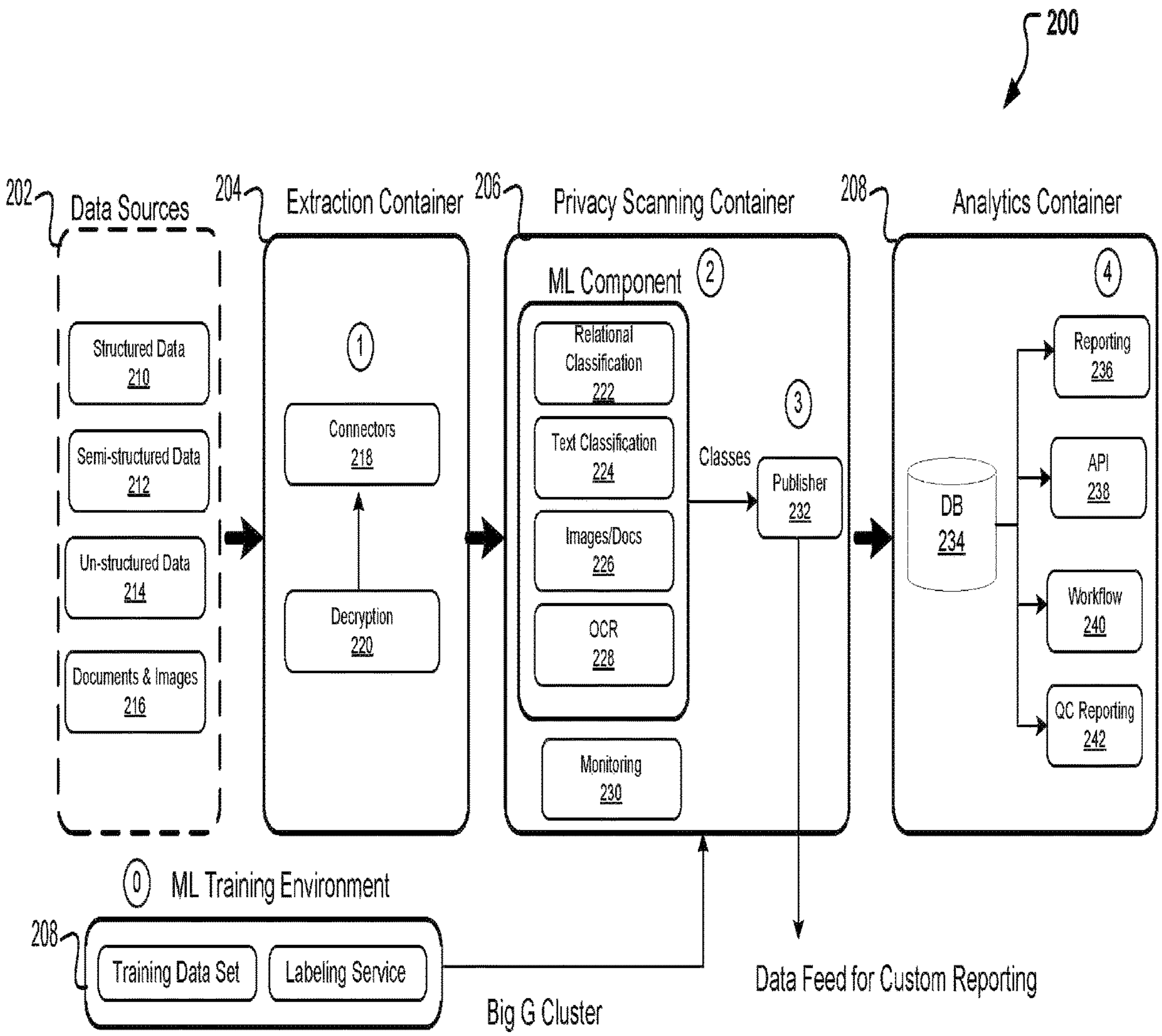
FIG. 2 illustrates a diagram of pluggable privacy data containers.

In order to ensure the various data categories 100 and processes presented above and in conjunction with FIG. 1 are followed, system 200 of FIG. 2 is introduced. In one embodiment, privacy system 200 is presented as a system and method for privacy data containment and reporting. Privacy system 200 includes a combination of containers and optional plug-ins enabling a flexible and customizable system and infrastructure for data privacy protection. Therefore, privacy system, unlike convention systems provides a modular and pluggable container system for privacy system safeguarding. Generally, privacy system 200 can include the reception of user information from numerous data sources 202. This information reception can occur from an account sign-up, website visited, social media post, a case memo communication, application interaction, third-party or secondary device, etc. Data sources can include information that can appear and be formatted in varying ways. For example, the data sources 202 can provide data that is in the form of structured data, semi-structured data, a data lake, etc. In addition, the privacy system 200 can also scan and receive unstructured data, documents and images, which conventional systems cannot generally do.

Privacy system 200, therefore initiates the safeguarding process by first transferring the information received into an extraction container 204. The extraction container 204 can be a container used for analyzing the information received and extracting the privacy data from the information. As illustrated, the extraction container 204 can include connectors and decryption models and algorithms in place for use in extracting the relevant information. In some instances, the extraction container 204 may be part of privacy system 200, while in other instances, the extraction container 204 can be an external pluggable container provided by the entity using the privacy system 200. Further, the extraction container 204 may be designed and tailor to extract information most relevant and specific to the organization, company, or other entity.

Once the privacy data has been extracted, the privacy data may be transferred to a privacy scanning container 206. The privacy scanning container 206 is a subsystem, designed to scan the privacy data extracted and contain potentially sensitive data. Therefore, privacy scanning container 206 can include various modules, components, processors and the like which can analyze the data. For exemplary purposes, a machine learning component, publisher, and monitoring component as illustrated in privacy scanning container 206. Machine learning component for example can include various deep learning models used for in scanning the various data types received. For example, the deep learning and machine learning models can be used in the classification and identification of recognition of privacy data which can be found in images, documents, text, and the like. The models can include learning algorithms such those including relational classification, support vector machines, word2vec. Additionally, other learning techniques including natural language recognition, regression analysis, clustering, decision tree analysis, the like may also be used.

Illustrated with privacy system 200, is a machine learning training environment 208 which may be used in conjunction to the privacy scanning container 206 for the data analytics and classification. The machine learning environment may include a training data set, labeling service, and other useful information for use in with the machine learning component and models. Additionally, the machine training environment may derive from the Bio Innovation Growth mega cluster (BIG-C cluster) as it coincides with Europe's industrial cluster and applicable to the processing of privacy data under the general data protection regulation (GDPR). Alternatively, the machine training environment may include training sequences and labeling services applicable to other regulations, processes in place which are relevant in classifying data and in particular privacy data.

For data monitoring of the current data, additional data extracted, and/or output data to the next container, a monitoring component may be included in the privacy scanning component 206. Additionally, as indicated, the privacy scanning container 206 may also include a publisher module designed to aid in the data reporting. For example, in one instance the publisher may be used to provide a data feed to an external, pluggable, or other modular component for custom reporting. This can include the selection privacy data scanned and used to build a customizable report as most relevant to the entity. In another instance, once scanned, the data may be transferred (as needed) to an analytics container 208 where the data can be stored, analyzed, and reported for further analysis. For example, the analytics container 208 may be used to report out information on user consent provided, provide a lineage/provenance of a transaction, details regarding data scanned, etc.

Figure 7:
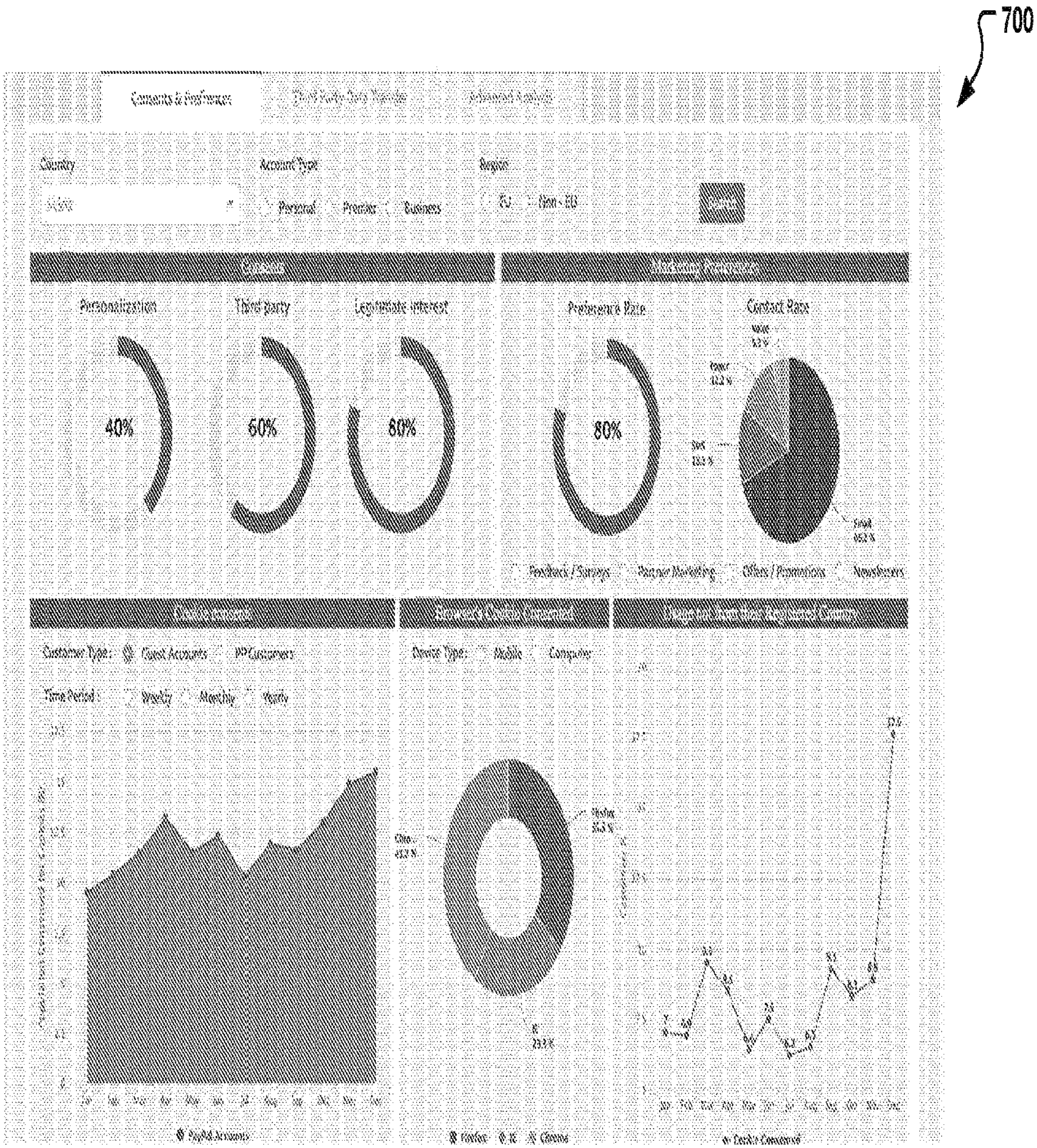
FIG. 7 illustrates a sample model run illustrating privacy data consent analysis.
Figure 8:
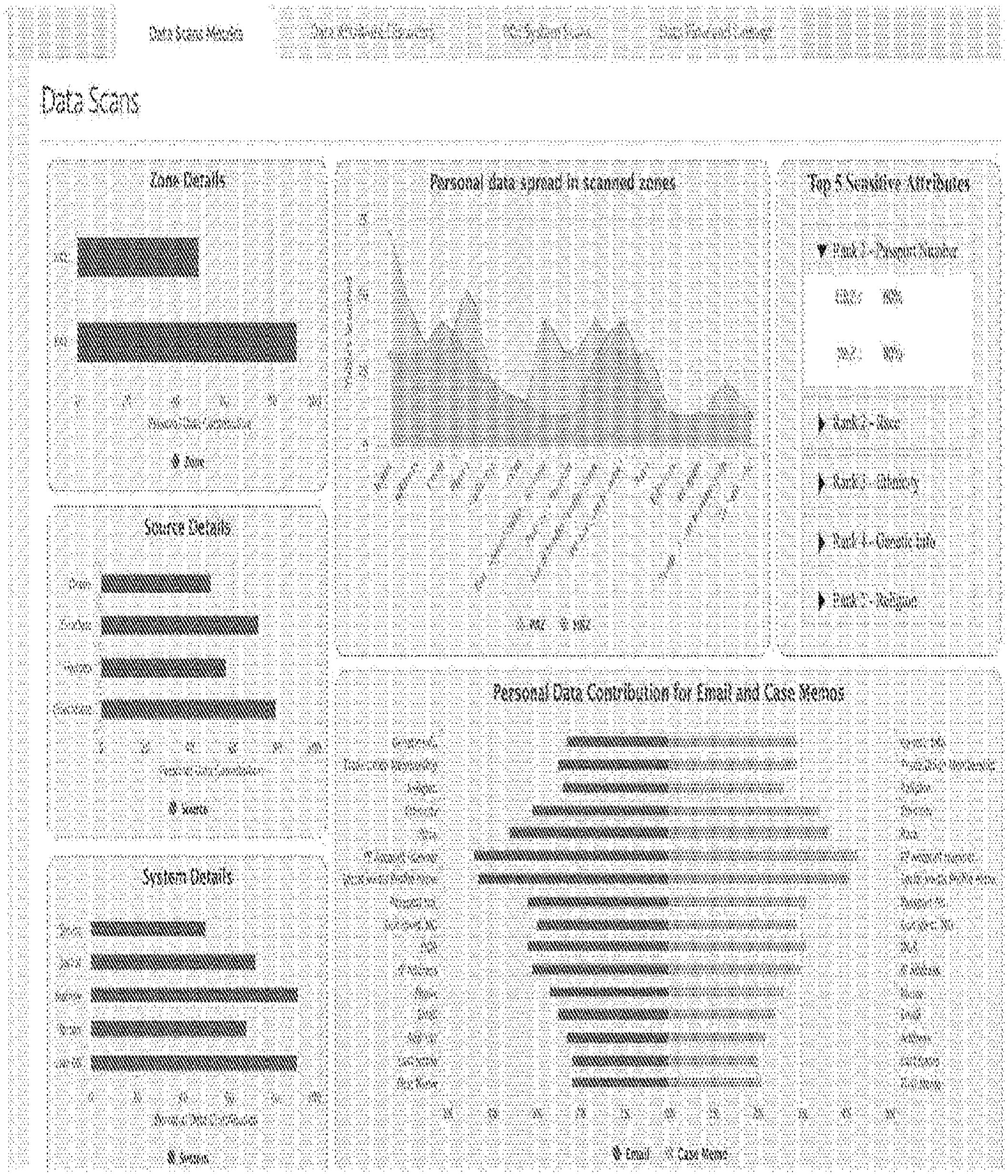
FIG. 8 illustrates another sample model run illustrating privacy data scan analysis.
Figure 9:
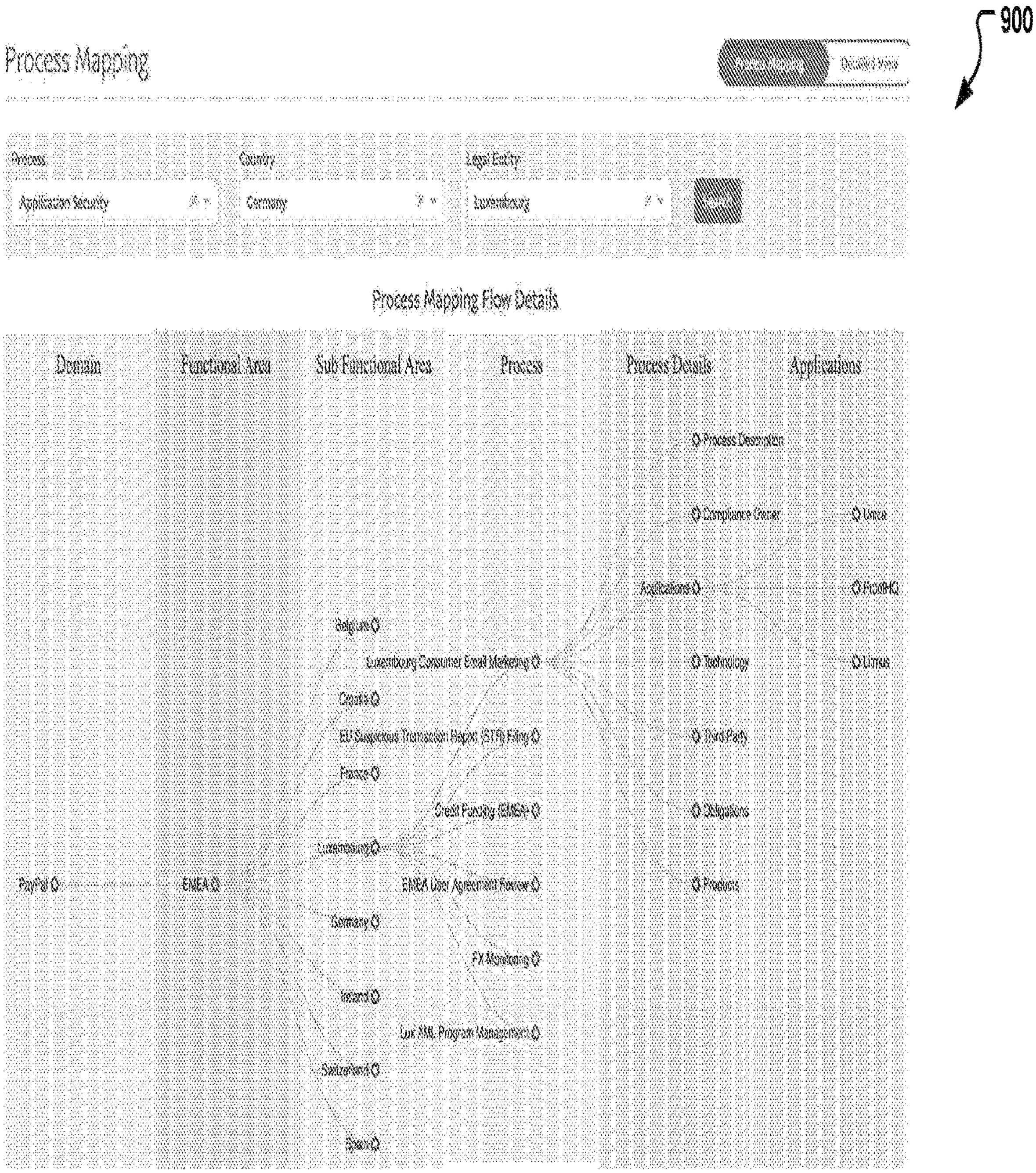
FIG. 9 illustrates still another sample model run illustrating privacy data mapping analysis.

Data reporting performed by the analytics container can also include the use of a data privacy cockpit design to provide a user interface for view and access of personal data across various systems using numerous metrics, heatmaps, and lineage charts. A dashboard and reporting system may further be used to illustrate the user consent reporting across various platforms as indicated. As such, further to reporting, an application programming interface (API), workflow, and quality center (QC) reporting mechanisms may also be components and/or software platforms integrated into the analytics center 208. FIGS. 7-9 below provide exemplary reports possible using the analytics container 208.

Figure 3:
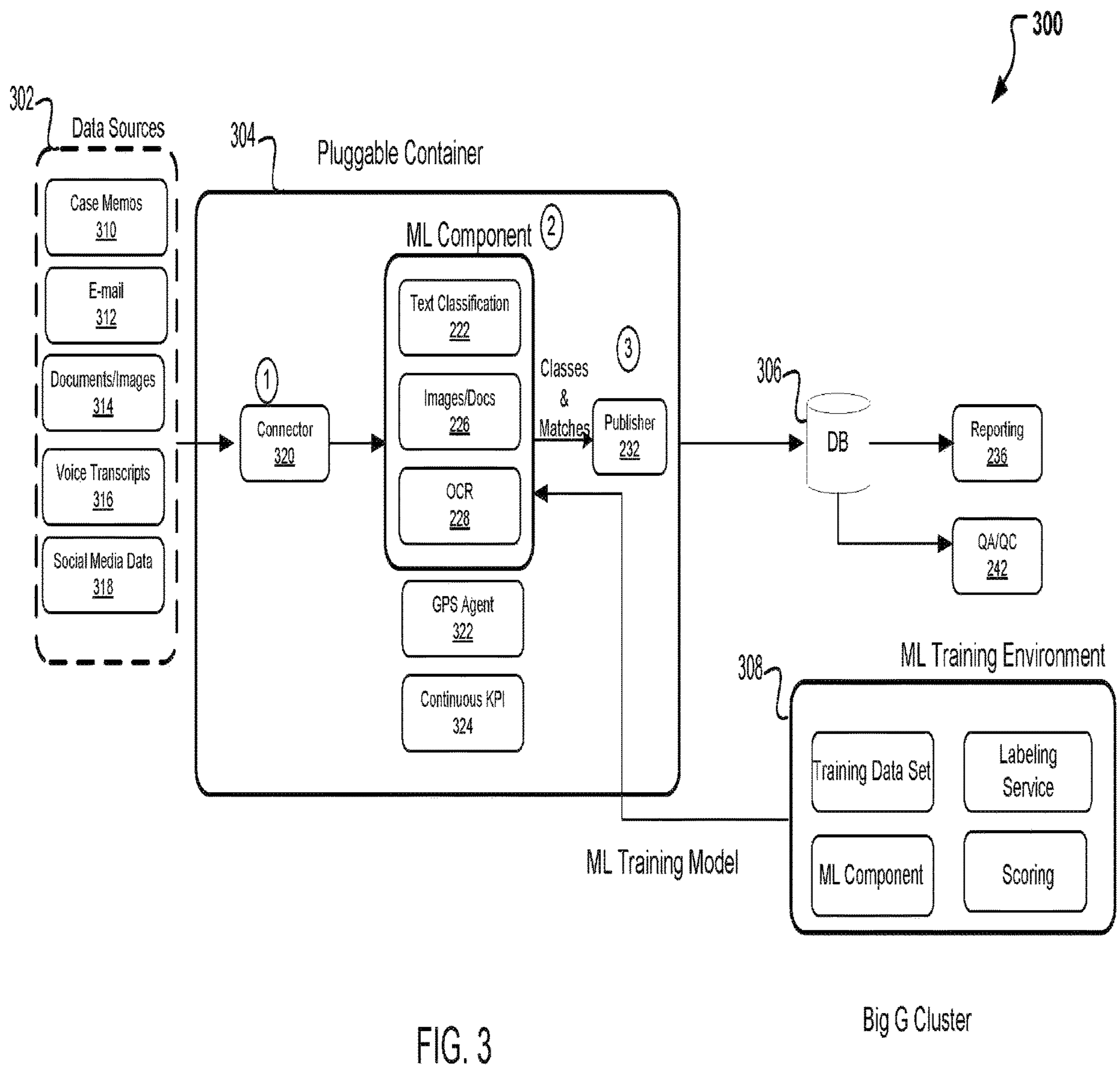
FIG. 3 illustrates an exemplary implementation of an unstructured privacy data container.

As indicated, privacy system 200 provides a modular and customizable container system which can be used in conjunction with other applications and/or systems and/or with more, less, or upgraded containers. Thus, turning to FIG. 3, a privacy system 300 is presented and configured for unstructured data implementation. As illustrated, like privacy system 200, data sources, scanning containers, ML training, and reporting persist in this implementation. However, this customized implementation excludes the optional scanning container previously implemented in privacy system 200. In the implementation of the privacy system 300 for unstructured data containment and reporting, data sources again provide the privacy data used. Note that for privacy system 300 for unstructured data containment and reporting, the for unstructured data, the data may be found in case memos, e-mails, documents, images, voice transcriptions, social media posts, and the like. The data arrives at the privacy scanning container 304 where the data may be analyzed, classified, and contained. Additionally, notice that in this instance since the scanning container is not being used, a connector component may be used as a scanning mechanism for the extraction and decryption of the data received. Further, the data analysis, classification, and containment can also occur on the privacy scanning module 304 which can use various machine learning and other deep learning models for text, image, and other unstructured data classification.

Additionally, an ML training model 308 can in with the machine learning and learning algorithms used by the ML component. The ML training model 308 can include but is not limited to providing training data sequences, labeling services, and scoring. Once the data is scanned and classified (e.g., for sensitivity), the data may be contained and/or stored in a database 306 and later extracted for reporting 310. Additionally or alternatively, the data may also be retrieved for quality assurance measurements and analytics.

Figure 4:
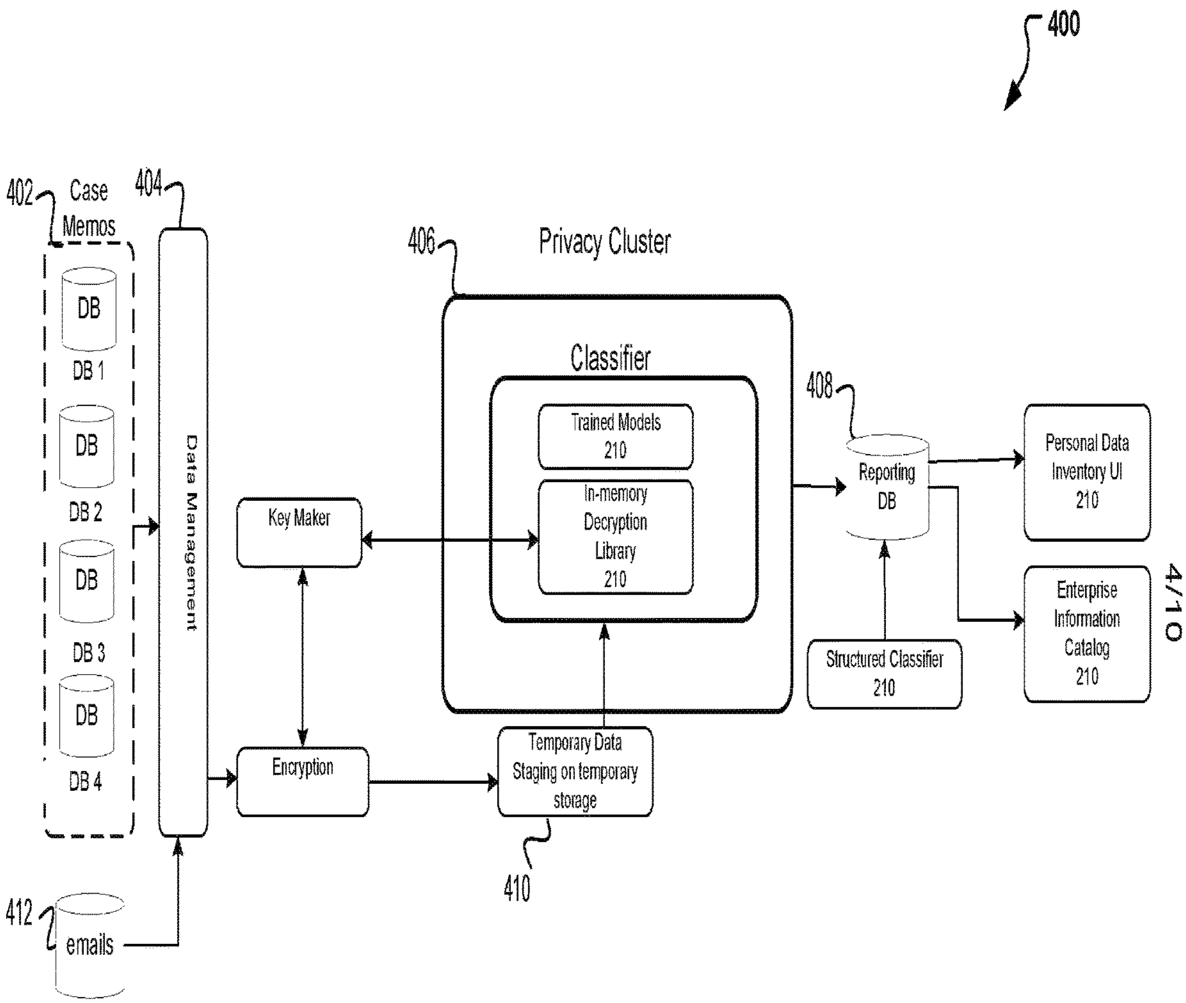
FIG. 4 illustrates an exemplary implementation of an unstructured privacy data system architecture.

Turning to FIG. 4, an architectural view of the implementation of a customized unstructured privacy system 400 is presented for use with unstructured data. As indicated above, unlike conventional systems, privacy system 200 is a modular system capable of being modified/customized to meet a user's need and is capable of scanning, modularizing, and reporting on unstructured data. As such, FIG. 4 illustrates an exemplary unstructured privacy data system architecture. As an example, the unstructured data illustrated includes the reception of case memos 402 and emails 412 deriving from various databases and other sources for data privacy classification and safeguarding.

The unstructured data may then arrive at a data management system 404 where data may be stored, for later access and data governance and compliance may be ensured. Beyond the data management system the data can arrive at the privacy data cluster 406 where as previously described data can be scanned, classified, and contained. In addition, a machine learning training model 410 may be used for training the models used in the classification. In some instances, the machine learning training model 410 can include temporary data which can be feed to the privacy data cluster 406 for use with the trained models and in conjunction with decryption libraries which aid in the privacy data extraction. Following data classification, the privacy data can then be used for reporting. In one embodiment, the unstructured privacy data can be stored in a reporting database 408, which can be pulled for personal data reporting, cataloging, and used with a structured classifier. As previously indicated, reporting can occur using a reporting cockpit for display on a user interface via a system dashboard.

Note that further to the use of the privacy data cluster 406, other pluggable containers may be added and customized per user preferences. Additionally, encryption and key maker components may also be used in addition to other modules not illustrated on FIG. 4.

To illustrate how an unstructured data may be captured by the unstructured privacy system 400, FIGS. 5A-5B are included for illustration. FIG. 5A is presented to illustrate how an email may be received by the privacy system. As illustrated, the data received is unstructured with text, mixed with hyperlinks, and other data types. FIG. 5B illustrates the data that was extracted and classified using the privacy system.

Figure 6:
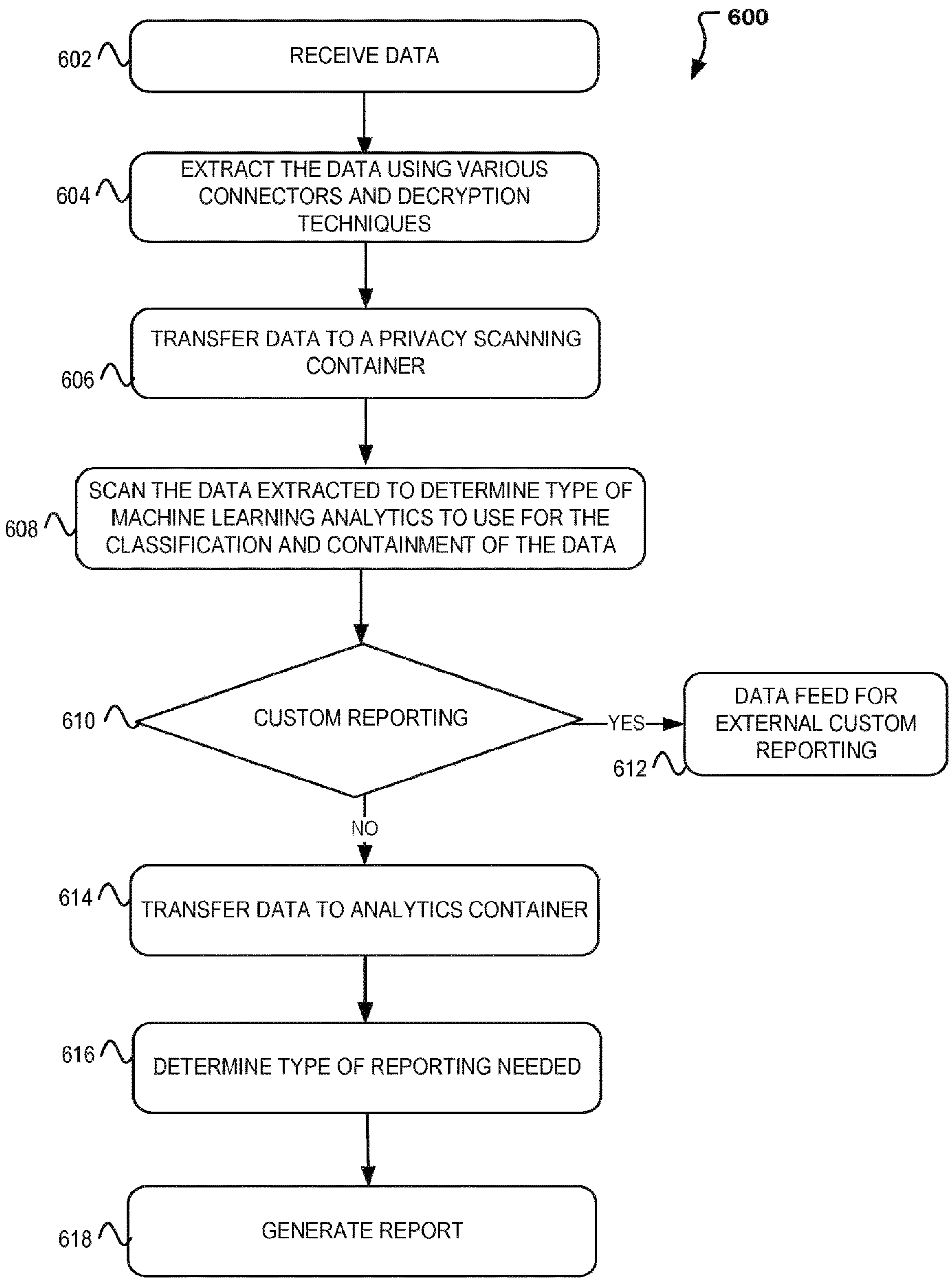
FIG. 6 illustrates a flow diagram illustrating operations for privacy data containment and reporting.

Turning to FIG. 6, the overall process privacy data safeguarding is presented. In particular, FIG. 6 illustrates a flow diagram illustrating operations for privacy data containment and reporting. According to some embodiments, process 600 may include one or more of operations 602-618, which may be implemented, at least in part, in the form of executable code stored on a non-transitory, tangible, machine readable media that, when run on one or more hardware processors, may cause a system to perform one or more of the operations 602-618.

Process 600 may begin with operation 602, where data is retrieved. The data retrieved may come in the form of structured data, unstructured data, data lakes, documents, images, etc. In some instances, the data retrieved from user posts, images, emails, case memos, and other sources. Following retrieval of the data, the data retrieved and or received may then be preprocessed at operation 604 where the data is extracted using various connectors and decryption techniques. The data may be decrypted to identify sensitive or personal information found in the data received at operation 602.

After the data is extracted, the data may be transferred to a privacy scanning container at operation 606. The privacy scanning container may act as the brains of the privacy system, where the privacy data extracted may be analyzed using machine learning analytics and deep learning models in order to classify and contain the private data at operation 608.

Once the data has been contained, the data may be used for reporting. At operation 610, a determination is made as to the type of reporting is desired. If custom reporting is desired by an entity (internal or external entity), then the data is feed for external custom reporting at operation 612. Alternatively, is the reporting is kept internally or used in conjunction with a privacy system reporting cockpit, then the data may continue to operation 614. At operation 614, the data may be transferred to an analytics container where a determination may be made on the type of reporting desired via operation 618.

In order to illustrate the possible reporting tables, heatmaps, and lineage, FIGS. 7-9 are presented. In particular, FIGS. 7-9 illustrate sample reporting model runs illustrating privacy data analysis. FIG. 7 begins with a sample report which may be presented to a user illustrating a summary of consents provided by one or more users. For example, consent report 700 can begin with a summary of the type of consent received (e.g., personalized, third party, interest based, etc.), marketing preferences set by one or more customers, cookie consent, etc.

FIG. 8 provides and exemplary sample report disclosing data scans. For example, the sample report can include the type of privacy data scanned and the source from where the data was obtained. In FIG. 8, the scan report 800 also illustrates a distribution of private data obtained and the source. For example, a horizontal bar graph is illustrated presenting the type and source of the data. In this instance, date of birth, name, email, IP address, and other details were retrieved from emails and similarly from case memos.

Turning to FIG. 9, yet another exemplary report is illustrated. In particular, in FIG. 9, a mapping report 900 is illustrated providing the lineage of the data including domain, functional areas, and processes encountered. As another example, the mapping report 900 can include a lineage/provenance explaining a processed provided. For example, mapping report 900 may be used to illustrate a financial entity (e.g., PayPal) processed a complaint and presented to regulators.

Figure 10:
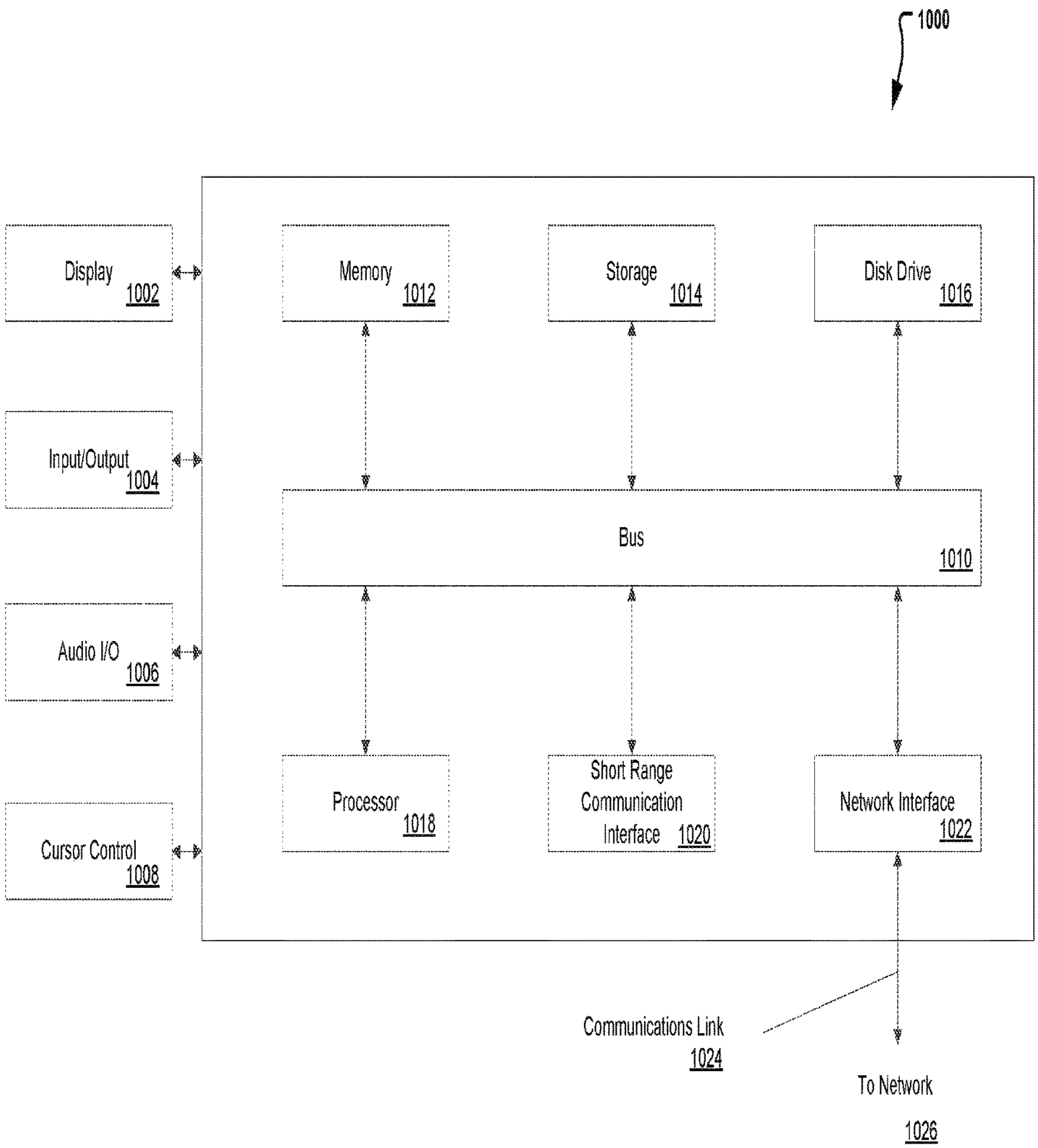
FIG. 10 illustrates an example block diagram of a computer system suitable for implementing one or more devices of the communication systems of FIGS. 1-9.

Note that additional parameters and uses are further available for use with bi-factor feature method extraction method presented in process 600 and FIGS. 6-9 are presented for illustration purposes. Further, process 600 may be implemented using one or more systems. Therefore, where applicable, various embodiments provided by the present disclosure may be implemented using hardware, software, or combinations of hardware and software. For example, FIG. 10 illustrates, in block diagram format, an example embodiment of a computing environment adapted for implementing a system for privacy data containment and reporting. As shown, a computing environment 1000 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 6 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

In various implementations, a device that includes computer system 1000 may comprise a personal computing device (e.g., a smart or mobile device, a computing tablet, a personal computer, laptop, wearable device, PDA, server system, etc.) that is capable of communicating with a network 1026. A service provider and/or a content provider may utilize a network computing device (e.g., a network server) capable of communicating with the network. It should be appreciated that each of the devices utilized by users, service providers, and content providers may be implemented as computer system 1000 in a manner as follows.

Additionally, as more and more devices become communication capable, such as new smart devices using wireless communication to report, track, message, relay information and so forth, these devices may be part of computer system 1000. For example, windows, walls, and other objects may double as touch screen devices for users to interact with. Such devices may be incorporated with the systems discussed herein.

Computer system 1000 may include a bus 1010 or other communication mechanisms for communicating information data, signals, and information between various components of computer system 1000. Components include an input/output (I/O) component 1004 that processes a user action, such as selecting keys from a keypad/keyboard, selecting one or more buttons, links, actuatable elements, etc., and sending a corresponding signal to bus 1010. I/O component 1004 may also include an output component, such as a display 1002 and a cursor control 1008 (such as a keyboard, keypad, mouse, touchscreen, etc.). In some examples, I/O component 1004 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 1018, which may be a micro-controller, digital signal processor (DSP), or other processing component, that processes these various signals, such as for display on computer system 1000 or transmission to other devices over a network 1026 via a communication link 1024. Again, communication link 724 may be a wireless communication in some embodiments. Processor 1018 may also control transmission of information, such as cookies, IP addresses, images, transaction information, learning model information, SQL support queries, and/or the like to other devices.

Components of computer system 1000 also include a system memory component 1012 (e.g., RAM), a static storage component 1014 (e.g., ROM), and/or a disk drive 1016. Computer system 1000 performs specific operations by processor 1018 and other components by executing one or more sequences of instructions contained in system memory component 1012 (e.g., for engagement level determination). Logic may be encoded in a computer readable medium, which may refer to any medium that participates in providing instructions to processor 1018 for execution. Such a medium may take many forms, including but not limited to, non-volatile media, volatile media, and/or transmission media. In various implementations, non-volatile media includes optical or magnetic disks, volatile media includes dynamic memory such as system memory component 1012, and transmission media includes coaxial cables, copper wire, and fiber optics, including wires that comprise bus 1010. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 1000 may also include a short range communications interface 1020. Short range communications interface 1020, in various embodiments, may include transceiver circuitry, an antenna, and/or waveguide. Short range communications interface 1020 may use one or more short-range wireless communication technologies, protocols, and/or standards (e.g., WiFi, Bluetooth®, Bluetooth Low Energy (BLE), infrared, NFC, etc.).

Short range communications interface 1020, in various embodiments, may be configured to detect other devices (e.g., user device, etc.) with short range communications technology near computer system 1000. Short range communications interface 1020 may create a communication area for detecting other devices with short range communication capabilities. When other devices with short range communications capabilities are placed in the communication area of short range communications interface 1020, short range communications interface 1020 may detect the other devices and exchange data with the other devices. Short range communications interface 1020 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 1020 may identify a local area network using a short range communications protocol, such as WiFi, and join the local area network. In some examples, computer system 1000 may discover and/or communicate with other devices that are a part of the local area network using short range communications interface 1020. In some embodiments, short range communications interface 1020 may further exchange data and information with the other devices that are communicatively coupled with short range communications interface 1020.

In various embodiments of the present disclosure, execution of instruction sequences to practice the present disclosure may be performed by computer system 1000. In various other embodiments of the present disclosure, a plurality of computer systems 1000 coupled by communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 1024 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory storing instructions; and a processor coupled to the non-transitory memory and configured to read the instructions from the non-transitory memory to cause the system to perform operations comprising:

extracting privacy information from a plurality of sources using a plurality of containers, wherein an extraction container of the plurality of containers includes received information that includes unstructured text and one or more unstructured data types that include the privacy information, wherein the extraction container is configured for use with an extraction process that extracts the privacy information from the received information using a decryption library corresponding to the extraction container, and wherein the extraction process is configured to extract information from at least one of: a communication, a case memo, a user post, a user image, or a personal information document;

transferring the extracted privacy information to a privacy scanning container;

scanning privacy information received in the privacy scanning container of the plurality of containers to determine a data type of the privacy information received, wherein the privacy scanning container is separate from the extraction container;

classifying the privacy information in the privacy scanning container based in part on the data type; and storing the classified privacy information in one of the plurality of containers.

2. The system of claim 1, wherein the classifying is performed using a deep learning model of the privacy scanning container, and wherein the classifying is further based in part on privacy data regulations.

3. The system of claim 1, wherein the plurality of containers allow transfer of the privacy information between a series of containers.

4. The system of claim 1, wherein the extracting includes an extraction of a portion of the privacy information using a decryption of personal information of the information received.

5. The system of claim 1, wherein the operations further comprise:

reporting, on a dashboard associated with the system, analytics associated with the classified privacy information.

6. The system of claim 1, wherein the plurality of containers are pluggable and reconfigurable.

7. A method comprising:

extracting privacy information from a plurality of sources using a plurality of containers, wherein an extraction container of the plurality of containers includes received information that includes unstructured text and one or more unstructured data types that include the privacy information, wherein the extraction container is configured for use with an extraction process that extracts the privacy information from the received information using a decryption library corresponding to the extraction container, and wherein the extraction process is configured to extract information from at least one of: a communication, a case memo, a user post, a user image, or a personal information document;

transferring the extracted privacy information to a privacy scanning container;

scanning privacy information received in the privacy scanning container of the plurality of containers to determine a data type of the privacy information received, wherein the privacy scanning container is separate from the extraction container;

classifying the privacy information in the privacy scanning container based in part on the data type; and storing the classified privacy information in one of the plurality of containers.

8. The method of claim 7, wherein the classifying is performed using a deep learning model of the privacy scanning container, and wherein the classifying is further based in part on privacy data regulations.

9. The method of claim 7, wherein the plurality of containers allow transfer of the privacy information between a series of containers.

10. The method of claim 7, wherein the extracting includes an extraction of a portion of the privacy information using a decryption of personal information of the information received.

11. The method of claim 7, further comprising:

reporting, on a dashboard associated with a system, analytics associated with the classified privacy information.

12. The method of claim 7, wherein the plurality of containers are pluggable and reconfigurable.

13. A non-transitory machine-readable medium having stored thereon machine readable instructions executable to cause a machine to perform operations comprising:

extracting privacy information from a plurality of sources using a plurality of containers, wherein an extraction container of the plurality of containers includes received information that includes unstructured text and one or more unstructured data types that include the privacy information, wherein the extraction container is configured for use with an extraction process that extracts the privacy information from the received information using a decryption library corresponding to the extraction container, and wherein the extraction process is configured to extract information from at least one of: a communication, a case memo, a user post, a user image, or a personal information document;

transferring the extracted privacy information to a privacy scanning container;

scanning privacy information received in the privacy scanning container of the plurality of containers to determine a data type of the privacy information received, wherein the privacy scanning container is separate from the extraction container;

classifying the privacy information in the privacy scanning container based in part on the data type; and storing the classified privacy information in one of the plurality of containers.

14. The non-transitory machine-readable medium of claim 13, wherein the classifying is performed using a deep learning model of the privacy scanning container, and wherein the classifying is further based in part on privacy data regulations.

15. The non-transitory machine-readable medium of claim 13, wherein the plurality of containers allow transfer of the privacy information between a series of containers.

16. The non-transitory machine-readable medium of claim 13, wherein the extracting includes an extraction of a portion of the privacy information using a decryption of personal information of the information received.

17. The non-transitory machine-readable medium of claim 13, wherein the operations further comprise:

reporting, on a dashboard associated with a system, analytics associated with the classified privacy information.

18. The non-transitory machine-readable medium of claim 13, wherein the plurality of containers are pluggable and reconfigurable.

19. The system of claim 5, wherein the analytics are reported from an analytics container that is configured for analyzing the classified privacy information, and wherein the analytics include at least a user consent provided.

20. The method of claim 11, wherein the analytics are reported from an analytics container that is configured for analyzing the classified privacy information, and wherein the analytics include at least a user consent provided.

* * * * *